United States Patent [19]

Hallerberg

[11] 4,018,318

[45] Apr. 19, 1977

[54] WEDGING FREE-WHEEL CLUTCH

[75] Inventor: Karl J. Hallerberg, Plankstadt, Germany

[73] Assignee: Borg-Warner, GmbH, Heidelberg, Germany

[22] Filed: Dec. 9, 1974

[21] Appl. No.: 530,634

[30] Foreign Application Priority Data

Dec. 13, 1973 Germany .......................... 2361916

[52] U.S. Cl. ........................... 192/41 A; 192/104 B
[51] Int. Cl.² ......................................... F16D 41/07
[58] Field of Search ................... 192/41, 45, 104 C

[56] References Cited

UNITED STATES PATENTS

| | | | |
|---|---|---|---|
| 751,027 | 2/1904 | Sweetland | 192/41 R |
| 2,609,903 | 9/1952 | Garnier | 192/41 R |
| 2,823,779 | 2/1958 | Johnson et al. | 192/41 R |
| 2,863,545 | 12/1958 | Spase | 192/104 C |
| 2,970,680 | 2/1961 | Cain | 192/41 R |
| 3,306,410 | 2/1967 | Hare | 192/41 R |
| 3,447,650 | 6/1969 | Dossier | 192/104 C |

Primary Examiner—Samuel Scott
Assistant Examiner—Wesley S. Ratliff, Jr.
Attorney, Agent, or Firm—Herman E. Smith

[57] ABSTRACT

A free-wheel clutch having centrifugally disengageable wedging members carried by a cage, in which the cage is frictionally coupled to the overrunning race by means of a resilient retaining ring. Various forms of the invention are shown including connections to the inner as well as to the outer race.

7 Claims, 8 Drawing Figures

WEDGING FREE-WHEEL CLUTCH

BACKGROUND OF THE INVENTION

The invention pertains to a wedging free-wheel clutch having centrifugally disengageable wedging members wherein the cage is frictionally connected with the overrunning race.

One basic condition for free-wheel clutches having centrifugally disengageable wedging members is that the cage rotate with the overrunning race whether it be the inner or outer race. In order to fulfill this requirement, the cage may be positively interlocked with the corresponding race or connected thereto in frictional fashion. The positive interlocking connection has not proven to be suitable, for in effecting positive connections to the wedging members, high levels of force arise and relative motion between the cage and race occurs. For this reason, frictional connections through the application of various frictional elements between the cage and race have been introduced. Thus it is, for example, a well known procedure to provide the cage with U-shaped springs which are arranged in such fashion that they lie with their flanges against the clamping surface of the overrunning outer race and thus frictionally connect the cage with the outer race. According to another solution in which the cage is frictionally connected with the inner race, a disc spring with a flat loaddeflection characteristic is engaged between a front side of the cage which is rotatable on the inner race and a retaining ring, for example, a spring ring mounted on the inner race. The disc spring provides the friction between the cage and the inner race by means of the retaining ring. It is also a well known procedure to attach leaf spring elements to the cage which partially span the inner race in order to provide a frictional force between the cage and inner race.

SUMMARY OF THE INVENTION

The invention is based on the task of creating a frictional connection between the cage and overrunning race while preserving the advantages of the hitherto known types of free-wheel clutches with a minimum of manufacturing and assembly expense. The solution of the task posed in a wedging free-wheel clutch of the aforementioned type is effected in accordance with the present invention by connecting the cage with at least one retaining ring which resiliently grips a groove in the overrunning race. In the new type of clutch, supplementary elements, such as resilient clamps, disc springs and the like, are thus avoided. The construction and operaton of the cage is not impaired through these types of frictional elements. The force of friction is not effected through a disc spring inserted between the cage and the retaining ring, but rather through the retaining ring itself. In the great majority of all constructional cases, such retaining rings have found application for a long time without their being seriously considered as a frictional element. It had to be first established that the friction of the normal retaining ring in the groove was sufficient for the necessary frictional connection between the cage and the overrunning race.

The normal retaining rings are pressed resiliently against the bottom of their holding groove in the inner race or the outer race. When the retaining ring is shifted in the groove, a frictional force arises which is not necessary for the original function of the retaining ring and which has not been used hitherto. Measurements, however, have proven that the frictional force of retaining rings, particularly those according to standard DIN 471, have the correct range to provide a functional frictional coupling between the cage and race when the cage is connected with the retaining ring.

The connection between the cage and retaining ring can be effected in several ways. Thus, for example, the cage and retaining ring can be connected through soldering, welding and the like. The most advantageous connection between the cage and retaining ring for purposes of assembly, however, is attained by means of a positive interlocking connection.

It is practical to connect the retaining ring to the side of the cage. A safety ring can be used as a retaining ring. The interlocking connection between the cage and the safety ring can be formed from a lug or pin projecting laterally from the cage which engages with an opening in the retaining ring. This embodiment has the special advantage that the same frictional force arises in either direction of relative rotation between the retaining ring and overrunning race of the clutch. In another embodiment, the interlocking connection can be formed from at least one pin projecting laterally from the cage which engages at least one hole of the retaining ring. Safety rings are normally provided with such holes in their end portions. If there is only one pin on the cage which is inserted in a hole of the safety ring, then there arises more than one frictional force between the safety ring and overruning race, depending on whether the clutch is operated in one or the other direction. An increased frictional force arises as a result of the wrapping effect of the safety ring in the overrunning race.

It is, however, also possible to attain similarly increased or decreased frictional forces in both directions of rotation of the coupling where the cage is provided with two pins each one of which is inserted with clearance in corresponding holes at the ends of the safety ring. The clearance of the pins in the holes is selected such that only one of the pins carries the safety ring, while the other pin does not engage the surface of the other hole.

The aforementioned lugs or pins are arranged on the side plates of the cage which are present in many cases.

According to another embodiment, the retaining ring can be a spring ring and the interlocking connection can be formed from a T-shaped piece projecting laterally from the cage, the leg of the piece engaging between the ends of the spring ring and the upper bar of the piece overhanging and covering the outer ends of the spring ring. The leg of the piece has the same effect as the aforementioned lug or pin inserted into the opening of the safety ring. The upper bar of the T-shaped piece covers the ends of the spring ring and thus prevents undesirable separation of the spring ring from the retaining groove.

Another possibility in the application of a spring ring is provided in that the spring ring is provided with an eyelet on one of its ends which surrounds a pin or lug projecting laterally from the cage into the eyelet. In this embodiment, as in the aforementioned embodiment with the pin on the cage and hole in the safety ring, there arises a frictional force which depends upon the direction of rotation.

The invention is described in further detail below with the help of several forms shown in the drawings.

DESCRIPTION OF THE PREFERRED EMBODIMENTS

Figure 1:
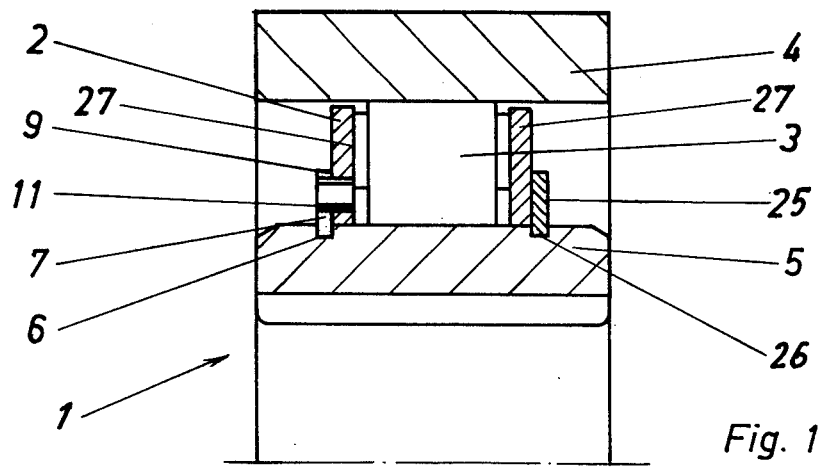
FIG. 1 shows the upper section of a free-wheel clutch in cross section.
Figure 2:
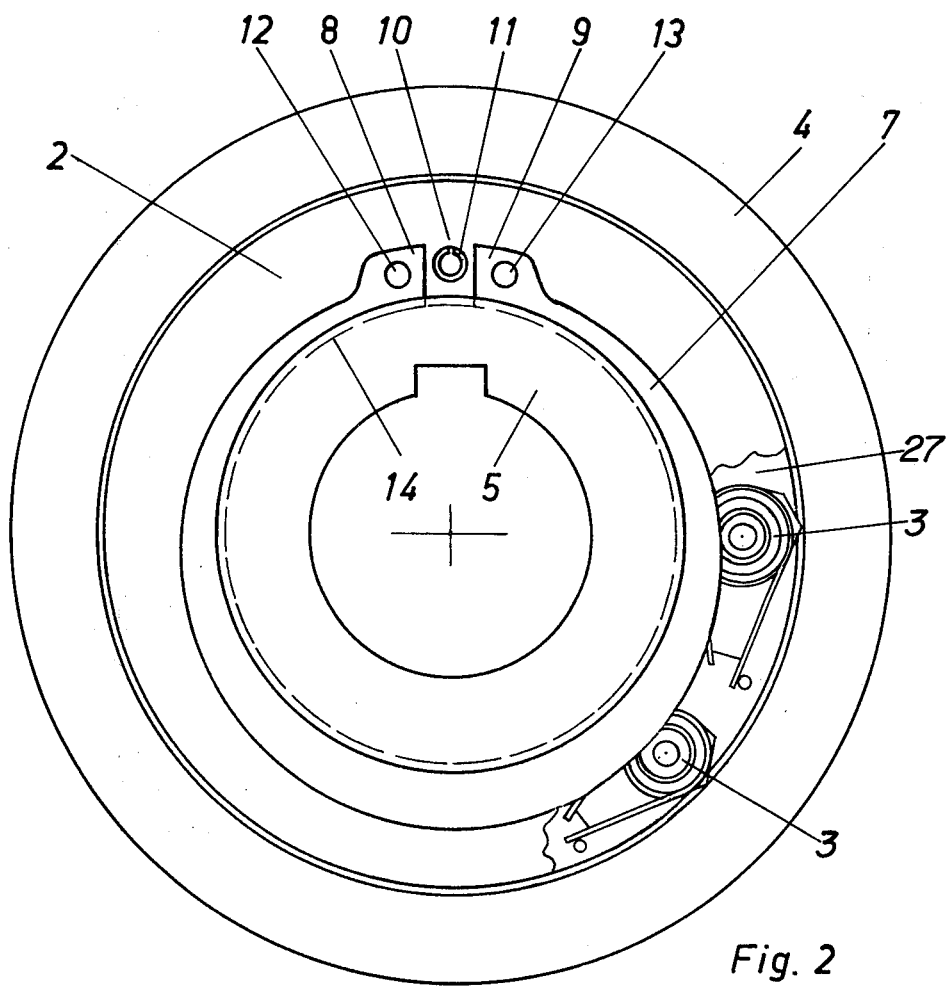
FIG. 2 shows the free-wheel clutch of FIG. 1 in front view.

The free-wheel clutch 1 shown in FIGS. 1 and 2 is provided with a cage 2 into which centrifugally disengageable wedging members 3 are inserted. The clutch 1 has an outer race 4 and an inner race 5. The cage 2 is mounted on the inner race 5. Safety rings 7, 25 are frictionally inserted in the grooves 6, 26 in inner race 5. The safety rings 7, 25 are of well known constructional type. They are not closed. The opening 10 lies between ends 8, 9 of safety ring 7. The cage 2 is provided with a pin 11 which during assembly of the clutch 1 is inserted between the ends 8, 9, of safety ring 7 in the opening 10. The pin 11 constitutes a positively engageable interlocking connection between cage 2 and safety ring 7 and ensures that during relative movement between cage 2 and inner race 5 the safety ring 7 is carried by the cage 2. Intermediate parts, such as disc springs and the like, between the safety ring 7 and the cage 2 are not necessary. The safety ring 7 is pressed against the bottom of the groove 6 through its own spring force. In FIG. 2, the base of the groove 6 is indicated by the dashed line 14. The forces arising between the safety ring 7 and the base of the groove result in such a great frictional coupling that an operable frictional force arises between the cage 2 and the ring 7.

Figure 3:
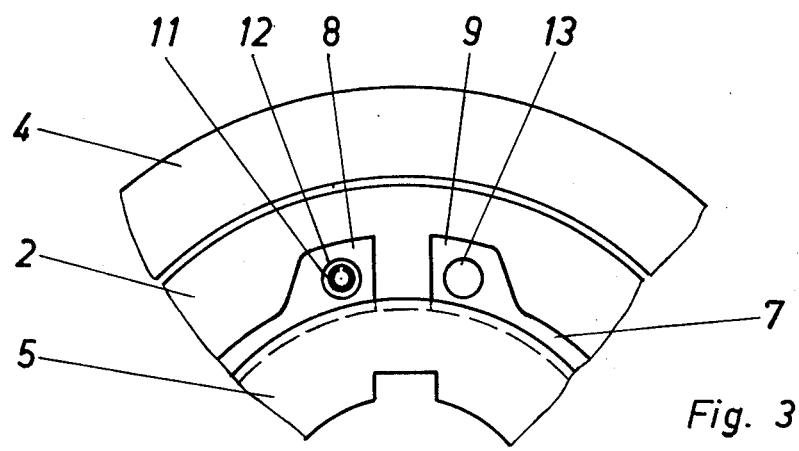
FIG. 3 shows another form of interlocking connection for the free-wheel clutch.

In special embodiments, as shown in FIG. 3, the pin 11 can be inserted in the one or the other hole 12, 13 in the ends 8, 9 of the safety ring 7. In the case of insertion of pin 11 in a hole, for example, 12, a different frictional coupling arises according to the respective direction of rotation. In the form shown in FIG. 3, an increased frictional coupling arises between the safety ring 7 and the inner race 5 when the cage 2 is shifted on the inner race 5 in clockwise fashion and carries the safety ring in the same direction.

Figure 4:
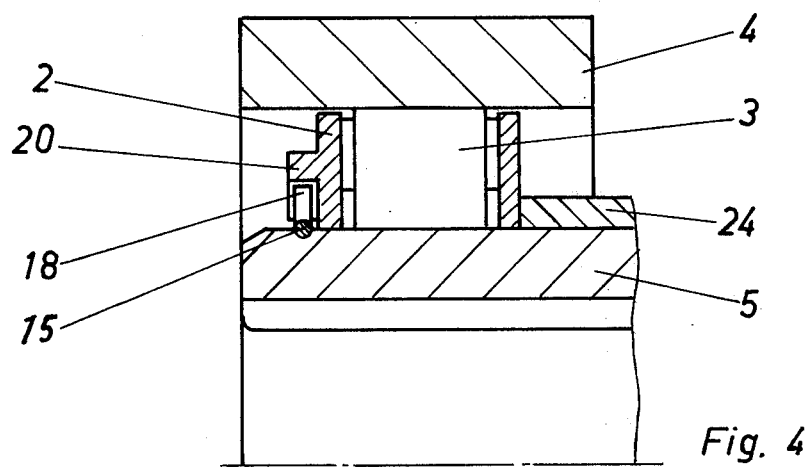
FIG. 4 shows the upper section of a free-wheel clutch with a spring ring in cross section.
Figure 5:
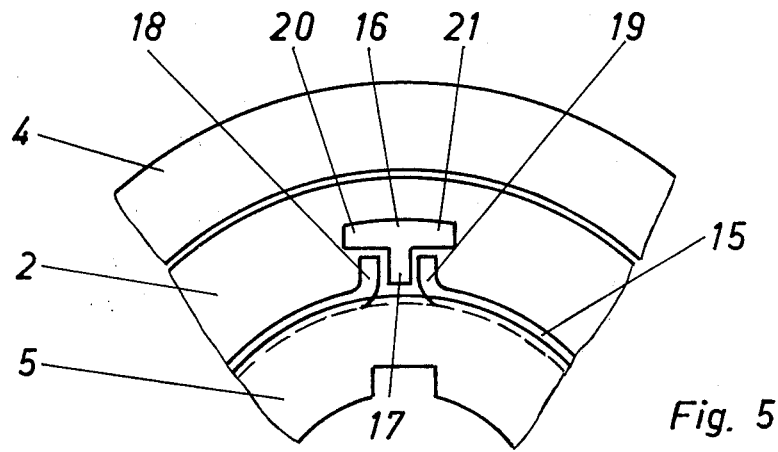
FIG. 5 shows a fragmentary front view of the free-wheel clutch of FIG. 4.

FIGS. 4 and 5 show a free-wheel clutch in which a wire spring ring 15 is used instead of the safety ring 7 shown in the aforementioned FIGURES. In this form, it is advisable to provide supplemental assurance against separation of the spring ring 15 from its groove. This can be effected in facile fashion by means of the T-shaped piece 16 or cage 2. The leg 17 of piece 16 engages between the ends 18, 19 of spring ring 15 and the upper bar 20, 21 of the piece 16 covers the ends 18, 19 of spring ring 15 so that separation of the spring ring 15 from the groove is safely prevented.

Figure 6:
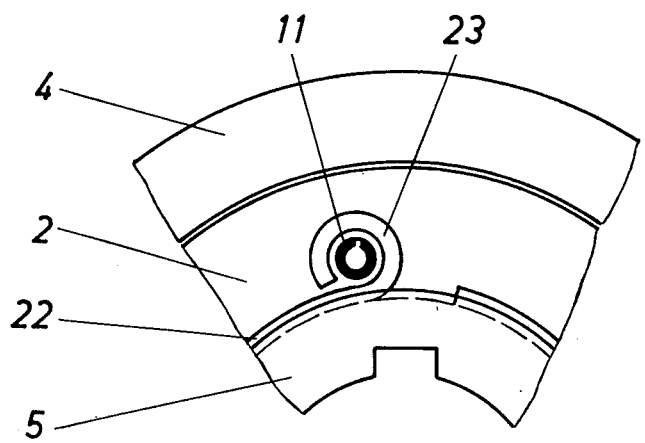
FIG. 6 shows a fragmentary front view of a free-wheel clutch having a spring ring with an eyelet.

In FIG. 6, the wire spring ring 22 is bent on one of its ends into an eyelet 23. A pin or the like of the cage 2 is inserted into this eyelet 23. There arises a connection between the cage 2 and one end of spring ring 22, — a fact which results in a varying frictional coupling according to the rotational direction of the cage 2 with respect to inner race 5. During rotation of cage 2 in clockwise fashion with respect to inner race 5, there arises an increased frictional coupling as a result of the wrapping effect of spring ring 22 on the inner race 5.

Figure 7:
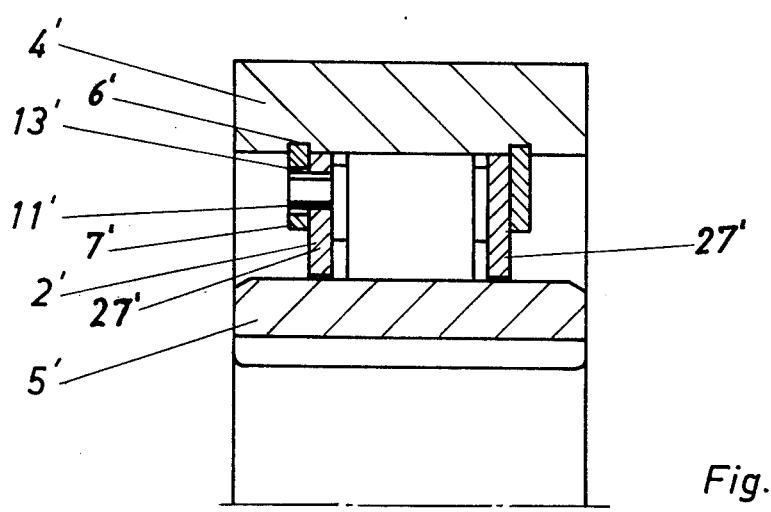
FIG. 7 shows the upper cross section of a free-wheel clutch in which the outer race is the overrunning race.
Figure 8:
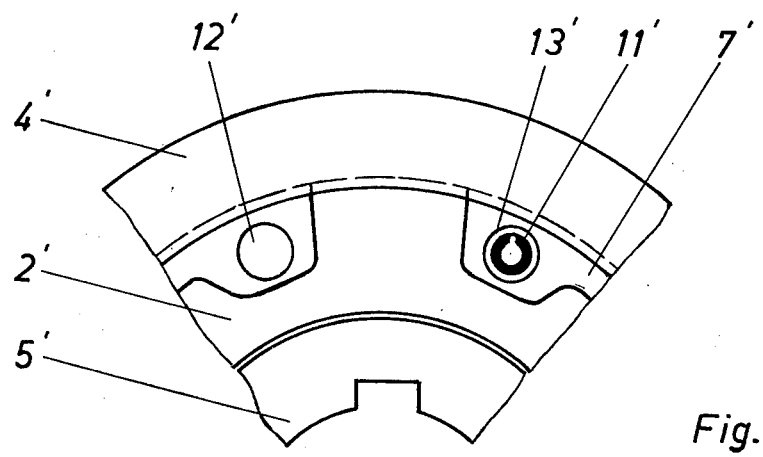
FIG. 8 shows a fragmentary front view of the free-wheel clutch of FIG. 7.

In FIGS. 7 and 8, a form of a free-wheel clutch 1 is shown in which the cage 2' is joined to the outer race 4'. The outer race 4' thus represents the overrunning race. The ring groove 6' is arranged in the outer race 4' and the safety ring 7' is inserted therein. The joint action of a cage 2' and the interlocking connection of pin 11' and hole 13', safety ring 7' and ring groove 6' is effected in the same fashion as is shown in the aforementioned FIGURES. However, it should be stated that with an overrunning outer race 4', a preferably unsymmetrical form is selected, i.e., the pin 11' of cage 2' should be inserted in an eye 12', 13' or an eyelet of the spring ring 7'.

The cages 2, 2' shown in the embodiments have side plates 27, 27' which can be held together normally by means of connecting devices not shown in detail.

In the FIGURES, only one safety ring 7, 15, 22 or 7' is connected with the cage 2 or 2' in interlocking or detachable fashion. If, however, the necessary frictional coupling between the safety ring and the overrunning race 5 or 4' is not sufficient, the second safety ring on the other side of the cage 2 can also be connected with the cage 2, whereby the desired increase in the frictional coupling is attained. In the example according to FIGS. 4 and 5, for assembly reasons, only one safety ring 15 is provided. On the other side of the cage 2, a bushing 24 is mounted on inner race 5 of the coupling.

I claim:

1. A free-wheel clutch having centrifugally disengageable wedging members in which the cage is frictionally connected with the overrunning race, characterized in that the cage has a positively engageable interlocking connection with at least one retaining ring resiliently gripping the base of a ring groove in the overrunning race providing frictional connection between said cage and said overrunning race.

2. A free-wheel clutch according to claim 1, characterized in that the retaining ring engages one side of the cage.

3. A free-wheel clutch according to claim 1, characterized in that said interlocking connection includes a projection extending laterally from the cage engaging an opening between the ends of the retaining ring.

4. A free-wheel clutch according to claim 1, characterized in that said interlocking connection includes at least one pin projecting laterally from the cage engaging at least one hole in the retaining ring.

5. A free-wheel clutch according to claim 1, characterized in that said interlocking connection includes a projection extending from a side plate of said cage.

6. A free-wheel clutch according to claim 1, characterized in that said retaining ring is a wire spring ring and said interlocking connection includes a T-shaped piece projecting laterally from said cage, having a leg engageable between the ends of the wire spring ring and having an upper bar extending radially over the outer ends of said spring ring.

7. A free-wheel clutch according to claim 1, characterized in that said retaining ring is a wire spring ring having an eyelet on one of its ends, and that said interlocking connection includes a pin projecting from the cage received within said eyelet.

* * * * *